(12) United States Patent
Yokoyama

(10) Patent No.: US 11,114,664 B2
(45) Date of Patent: Sep. 7, 2021

(54) METHOD FOR PRODUCING POSITIVE ACTIVE MATERIAL PARTICLE, METHOD FOR PRODUCING POSITIVE ELECTRODE PASTE, METHOD FOR MANUFACTURING POSITIVE ELECTRODE SHEET, AND METHOD FOR MANUFACTURING LITHIUM ION SECONDARY BATTERY

(71) Applicant: TOYOTA JIDOSHA KABUSHIKI KAISHA, Toyota (JP)

(72) Inventor: Tomohiro Yokoyama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 333 days.

(21) Appl. No.: 16/241,174

(22) Filed: Jan. 7, 2019

(65) Prior Publication Data
US 2019/0273256 A1 Sep. 5, 2019

(30) Foreign Application Priority Data

Mar. 2, 2018 (JP) .............................. JP2018-037838

(51) Int. Cl.
*H01M 4/525* (2010.01)
*H01M 4/04* (2006.01)
(Continued)

(52) U.S. Cl.
CPC ............. *H01M 4/525* (2013.01); *H01M 4/04* (2013.01); *H01M 4/24* (2013.01); *H01M 4/70* (2013.01);
(Continued)

(58) Field of Classification Search
CPC .......... H01M 4/525; H01M 4/04; H01M 4/70; H01M 4/24; H01M 2004/8689;
(Continued)

(56) References Cited

U.S. PATENT DOCUMENTS

| | | | |
|---|---|---|---|
| 2012/0112379 A1* | 5/2012 | Beppu | H01M 4/136 264/104 |
| 2013/0219703 A1 | 8/2013 | Mitsuhashi | |
| 2016/0197346 A1 | 7/2016 | Myung et al. | |

(Continued)

FOREIGN PATENT DOCUMENTS

| | | |
|---|---|---|
| JP | 2013-175325 A | 9/2013 |
| JP | 2019121420 A | 7/2019 |
| JP | 2019121529 A | 7/2019 |

(Continued)

*Primary Examiner* — Gary D Harris
(74) *Attorney, Agent, or Firm* — Sughrue Mion, PLLC

(57) ABSTRACT

A method for producing positive active material particles includes a contacting step of bringing a phosphate compound solution prepared into contact with untreated positive active material particles, the phosphate compound solution being prepared by dissolving phosphate compound into a first dispersion medium. The phosphate compound is at least one of inorganic phosphoric acid, a salt of inorganic phosphoric acid, organic phosphoric acid, and a salt of organic phosphoric acid. The method further includes a particle drying step, after the contacting step, of drying contacted-undried positive active material particles wetted with the phosphate compound solution to obtain positive active material particles each formed with a coating that contains phosphorus at each particle surface.

20 Claims, 8 Drawing Sheets

(51) Int. Cl.
*H01M 4/70* (2006.01)
*H01M 4/24* (2006.01)
H01M 4/86 (2006.01)
H01M 4/02 (2006.01)

(52) U.S. Cl.
CPC .............. *H01M 2004/028* (2013.01); *H01M 2004/8689* (2013.01)

(58) Field of Classification Search
CPC ....... H01M 2004/028; H01M 10/0585; H01M 10/052; H01M 4/0404; H01M 4/628; H01M 4/366; H01M 4/1391; H01M 4/131; H01M 10/4235; H01M 4/1397; H01M 10/0587; H01M 10/0525; H01M 4/62; H01M 4/0471; H01M 2220/20; Y02E 60/10; Y02E 60/50; C01G 53/42; C01B 25/30
USPC ....................................................... 429/223
See application file for complete search history.

(56) References Cited

U.S. PATENT DOCUMENTS

| | | | |
|---|---|---|---|
| 2016/0248079 A1 | 8/2016 | Myung et al. | |
| 2018/0083263 A1* | 3/2018 | Cho | ............... H01M 4/386 |
| 2019/0214638 A1 | 7/2019 | Yokoyama | |

FOREIGN PATENT DOCUMENTS

| | | |
|---|---|---|
| KR | 1020150018752 A | 2/2015 |
| KR | 1020150064320 A | 6/2015 |

* cited by examiner

METHOD FOR PRODUCING POSITIVE ACTIVE MATERIAL PARTICLE, METHOD FOR PRODUCING POSITIVE ELECTRODE PASTE, METHOD FOR MANUFACTURING POSITIVE ELECTRODE SHEET, AND METHOD FOR MANUFACTURING LITHIUM ION SECONDARY BATTERY

CROSS-REFERENCE TO RELATED APPLICATIONS

This application is based upon and claims the benefit of priority from the prior Japanese Patent Application No. 2018-037838 filed on Mar. 2, 2018, the entire contents of which are incorporated herein by reference.

BACKGROUND

Technical Field

The present disclosure relates to a method for producing positive active material particles that allow insertion and extraction of a lithium ion, a method for producing positive electrode paste including the positive active material particles, a method for manufacturing a positive electrode sheet containing the positive active material particles in an active material layer, and a method for manufacturing a lithium ion secondary battery provided with the positive electrode sheet.

Related Art

A lithium ion secondary battery (hereinafter, also simply referred to as a "battery") is manufactured by using positive active material particles that allow insertion and extraction of lithium ions. For example, lithium-nickel-cobalt-aluminum composite oxide particles, lithium-nickel-cobalt-manganese composite oxide particles, olivine-type lithium iron phosphate particles, and spinel-type lithium manganese oxide particles are known as the positive active material particles. One example of a conventional art is disclosed in Japanese unexamined patent application publication No. 2013-175325.

SUMMARY

Technical Problems

Meanwhile, on contact with water or moisture in the air, positive active material particles that allow insertion and extraction of lithium ions react with the water ($H_2O$) at the particle surfaces to generate lithium hydroxide (LiOH) ($Li_2O+H_2O \rightarrow 2LiOH$). Further, this lithium hydroxide reacts carbon dioxide ($CO_2$) in the air to generate lithium carbonate ($2LiOH+CO_2 \rightarrow Li_2CO_3+H_2O$). This lithium carbonate generated on the particle surfaces of the positive active material particles are resistive materials. When the positive active material particles react with water and thus lithium ions are released from the positive active material particles, the crystal structure of the positive active material particles changes, causing difficulty in insertion and extraction of the lithium ions into/from the positive active material particles. Accordingly, the IV resistance of a battery manufactured by using the above positive active material particles tends to become high.

The present disclosure has been made to address the above problems and has a purpose to provide a method for producing positive active material particles, a method for producing positive electrode paste, a method for manufacturing a positive electrode sheet, and a method for manufacturing a lithium ion secondary battery to prevent the IV resistance of the manufactured battery from becoming high due to contact of the positive active material particles with water and carbon dioxide in the air.

Means of Solving the Problems

To achieve the above-mentioned purpose, one aspect of the present disclosure provides a method for producing positive active material particles that allow insertion and extraction of a lithium ion, the method comprising: a contacting step of bringing a phosphate compound solution into contact with untreated positive active material particles, the phosphate compound solution being prepared by dissolving a phosphate compound into a first dispersion medium, and the phosphate compound being at least one of inorganic phosphoric acid ($H_3PO_4$), a salt of inorganic phosphoric acid, organic phosphoric acid, and a salt of organic phosphoric acid; and a particle drying step, after the contacting step, of drying contacted-undried positive active material particles wetted with the phosphate compound solution to obtain the positive active material particles each formed with a coating that contains phosphorus on a particle surface.

In the method for producing positive active material particles, the contacting step and the particle drying step are performed, thereby enabling removal of a resistive material, such as lithium carbonate, already formed on each particle surface of the untreated positive active material particles. Further, this method can produce the positive active material particles including, at each particle surface, a coating that contains phosphorus (hereinafter, also referred to as a "phosphorus-containing coating"). Such positive active material particles are less likely to react with water and carbon dioxide in the air as compared with positive active material particles not formed with any phosphorus-containing coating at each particle surface. Thus, lithium carbonate ($Li_2CO_3$) which is a resistive material is unlikely to be formed on the particle surfaces of the positive active material particles formed with the phosphorus-containing coatings. Furthermore, since the positive active material particles are less likely to react with water as compared with positive active material particles not formed with any phosphorus-containing coating at each particle surface, the positive active material particles formed with the phosphorus-containing coatings can suppress release of the lithium ion therefrom due to reaction with water and thereby prevent changes in the crystal structure of each positive active material particle. Consequently, the lithium ion secondary battery manufactured by using the above positive active material particles can reduce the IV resistance of the battery as compared with a lithium ion secondary battery manufactured by using positive active material particles not formed with any phosphorus-containing coating at each particle surface.

The "untreated positive active material particles" represent positive active material particles each of which is a particle not having been subjected to a treatment using the phosphate compound solution, that is, not having been formed with a phosphorus-containing coating, and containing lithium ions. Examples of the untreated positive active material particles may include lithium-nickel-cobalt-aluminum composite oxide particles, lithium-nickel-cobalt-manganese composite oxide particles, olivine-type lithium iron phosphate particles, and spinel-type lithium manganese oxide particles. The "contacted-undried positive active material particles" indicate positive active material particles having been brought into contact with a phosphate compound solution but are not dried yet.

Examples of the "salt of inorganic phosphoric acid", which will also be referred to as "inorganic phosphoric acid salt" hereinafter, may include lithium phosphate ($Li_3PO_4$), disodium phosphate ($Na_3PO_4$), and potassium phosphate ($K_3PO_4$). In the lithium ion secondary battery, lithium ions contribute to battery reaction. Thus, as the salt of inorganic phosphoric acid, the lithium phosphate may be especially used.

Examples of the "organic phosphoric acid" may include phenylphosphonic acid and methylphosphonic acid.

Examples of the "salt of organic phosphoric acid", which will also be referred to as "organic phosphoric acid salt", may include lithium salt of organic phosphoric acid, sodium salt of organic phosphoric acid, or potassic salt of organic phosphoric acid, concretely, lithium salt of phenylphosphonic acid, lithium salt of methylphosphonic acid, and so on. In the lithium ion secondary battery, lithium ions contribute to battery reaction. Thus, lithium salt of organic phosphoric acid may be especially used as the organic phosphoric acid salt.

The "first dispersion medium" may be selected from dispersion mediums that can dissolve phosphate compound according to a phosphate compound to be used. Examples of the first dispersion medium may include water, N-Methyl-2-Pyrolidon (NMP), organic solvent such as benzene.

The "coating that contains phosphorus (i.e., phosphorus-containing coating)" at the particle surface of each positive active material particle differs in composition by the phosphate compound used therein. For instance, when inorganic phosphoric acid or inorganic phosphoric acid salt is used as the phosphate compound, it is conceived that a coating made of lithium phosphate ($Li_3PO_4$) is formed. Further, when phenylphosphonic acid or phenylphosphonic acid salt is used, it is conceived that a coating made of lithium phenylphosphonic acid is formed.

The foregoing positive active material particle producing method may be configured such that the phosphate compound is either inorganic phosphoric acid or a combination of inorganic phosphoric acid and a salt of inorganic phosphoric acid, the first dispersion medium is water, and the phosphate compound solution before contacting with the untreated positive active material particles has a pH of 4.0 to 5.2.

It has been found that, when the phosphate compound is either inorganic phosphoric acid or a combination of inorganic phosphoric acid and a salt of inorganic phosphoric acid, and the first dispersion medium is water, the lower the pH of a phosphate compound solution before contacting with the untreated positive active material particles is, the more greatly the positive active material particles are damaged by the acid in the contacting step and subsequent steps, more concretely, lithium ions are eluted from the positive active material particles, causing irreversible changes in the crystal structure of the positive active material particles. On the other hand, when the pH of the phosphate compound solution before contacting with the untreated positive active material particles is too high, the salt of inorganic phosphoric acid is deposited in granular form into the phosphate compound solution.

In the foregoing producing method, in contrast, the pH of the phosphate compound solution before contacting with the untreated positive active material particles is adjusted to 4.0 to 5.2. When the phosphate compound solution has a pH of 4.0 or higher, it is possible to suppress the positive active material particles from becoming greatly damaged by acid as compared with the phosphate compound solution with a pH lower than 4.0. On the other hand, when the phosphate compound solution has a pH of 5.2 or lower, it is possible to prevent the salt of inorganic phosphoric acid from becoming deposited in the phosphate compound solution.

The foregoing positive active material particle producing method may be configured such that the phosphate compound is inorganic phosphoric acid, the first dispersion medium is water, and the method further comprises an alkali adding step of adding an alkali aqueous solution to the phosphate compound solution to adjust a pH of the phosphate compound solution to 5.2 or higher, the alkali adding step being performed after the contacting step and before the particle drying step.

When the phosphate compound is inorganic phosphoric acid and the first dispersion medium is water, the phosphate compound solution before contacting with the untreated positive active material particles tends to has a low pH. As described above, the lower the pH of the phosphate compound solution is, the more greatly the positive active material particles are damaged by acid in the contacting step and subsequent steps, that is, lithium ions are eluted, causing irreversible changes in crystal structure. In the foregoing producing method, in contrast, after the contacting step and before the particle drying step, an alkali aqueous solution is added in the alkali adding step to adjust the pH of the phosphate compound solution to 5.2 or higher. This can suppress big damage of the positive active material particles due to acid in the contacting step and subsequent steps as compared with a case where the alkali adding step is not performed.

Examples of the "alkali aqueous solution" may include various aqueous solutions of lithium hydroxide (LiOH), sodium hydroxide (NaOH), and potassium hydroxide (KOH). In the lithium ion secondary battery, lithium ions contribute to battery reaction. Thus, a lithium hydroxide solution may be especially used as the alkali aqueous solution.

In any one of the foregoing positive active material particle producing methods, the untreated positive active material particles may have a property that a dispersion liquid prepared by dispersing 1 gram of the untreated positive active material particles in 50 grams of water has a pH of 11.3 or higher.

In the foregoing producing method, the untreated positive active material particles used therein have the property that the pH of the aforementioned dispersion liquid is 11.3 or higher. Such untreated positive active material particles are particularly likely to react with water and carbon dioxide to thereby generate lithium hydroxide and further produce lithium carbonate. Thus, in the battery manufactured by directly using those untreated positive active material particles, the IV resistance is apt to become high. Therefore, as described above, the contacting step and the particle drying step may be performed to form a phosphorus-containing coating at the particle surface of each of the positive active material particles to thereby suppress reaction with water and carbon dioxide.

Furthermore, another aspect of the present disclosure provides a method for producing positive electrode paste including: positive active material particles that allow insertion and extraction of a lithium ion; and a second dispersion medium, the method comprising: a particle producing step of producing the positive active material particles by any one of the positive active material particle producing methods described above; and a mixed-paste forming step of mixing the positive active material particles and the second dispersion medium to produce the positive electrode paste.

In the foregoing positive electrode paste making method, the positive active material particles including the phosphorus-containing coating at each particle surface are produced in the particle producing step, and the positive electrode paste is produced by using these positive active material particles in the mixed-paste forming step. Thus, when a positive electrode sheet is manufactured by using this positive electrode paste and further a battery is manufactured by using this positive electrode sheet, the finished battery can reduce the IV resistance as compared with a battery manufactured by using positive active material particles not formed with any phosphorus-containing coating at each particle surface.

Furthermore, another aspect of the present disclosure provides a method for manufacturing a positive electrode sheet provided with a current collecting foil and an active material layer formed on the current collecting foil, the active material layer containing positive active material particles that allow insertion and extraction of a lithium ion, the method comprising: a paste producing step of producing a positive electrode paste by the positive electrode paste producing method described above; a coating step of applying the positive electrode paste onto the current collecting foil to form an undried active material layer; and a layer drying step of drying the undried active material layer on the current collecting foil to form the active material layer.

In the foregoing positive electrode sheet manufacturing method, the positive electrode paste including the positive active material particles including the phosphorus-containing coating at each particle surface is produced in the paste producing step, and the positive electrode sheet is manufactured by using this positive electrode paste. Thus, in the battery manufactured by using this positive electrode sheet can reduce the IV resistance as compared with a battery manufactured by using positive active material particles not formed with any phosphorus-containing coating at each particle surface.

Still further, another aspect of the present disclosure provides a method for manufacturing a lithium ion secondary battery provided with a positive electrode sheet including a current collecting foil and an active material layer formed on the current collecting foil, the active material layer containing positive active material particles that allow insertion and extraction of a lithium ion, the method comprising: a positive electrode sheet manufacturing step of manufacturing the positive electrode sheet by the positive electrode sheet manufacturing method described above; and a battery assembling step of assembling the lithium ion secondary battery by using the positive electrode sheet.

In the foregoing battery manufacturing method, the positive electrode sheet including the positive active material particles including the phosphorus-containing coating at each particle surface is manufactured in the positive electrode sheet manufacturing step, and a battery is assembled by incorporating this positive electrode sheet in the battery assembling step. Thus, the finished battery can reduce the IV resistance as compared with a battery manufactured by using positive active material particles not formed with any phosphorus-containing coating at each particle surface.

DETAILED DESCRIPTION OF THE EXEMPLARY EMBODIMENTS

First Embodiment

Figure 1:
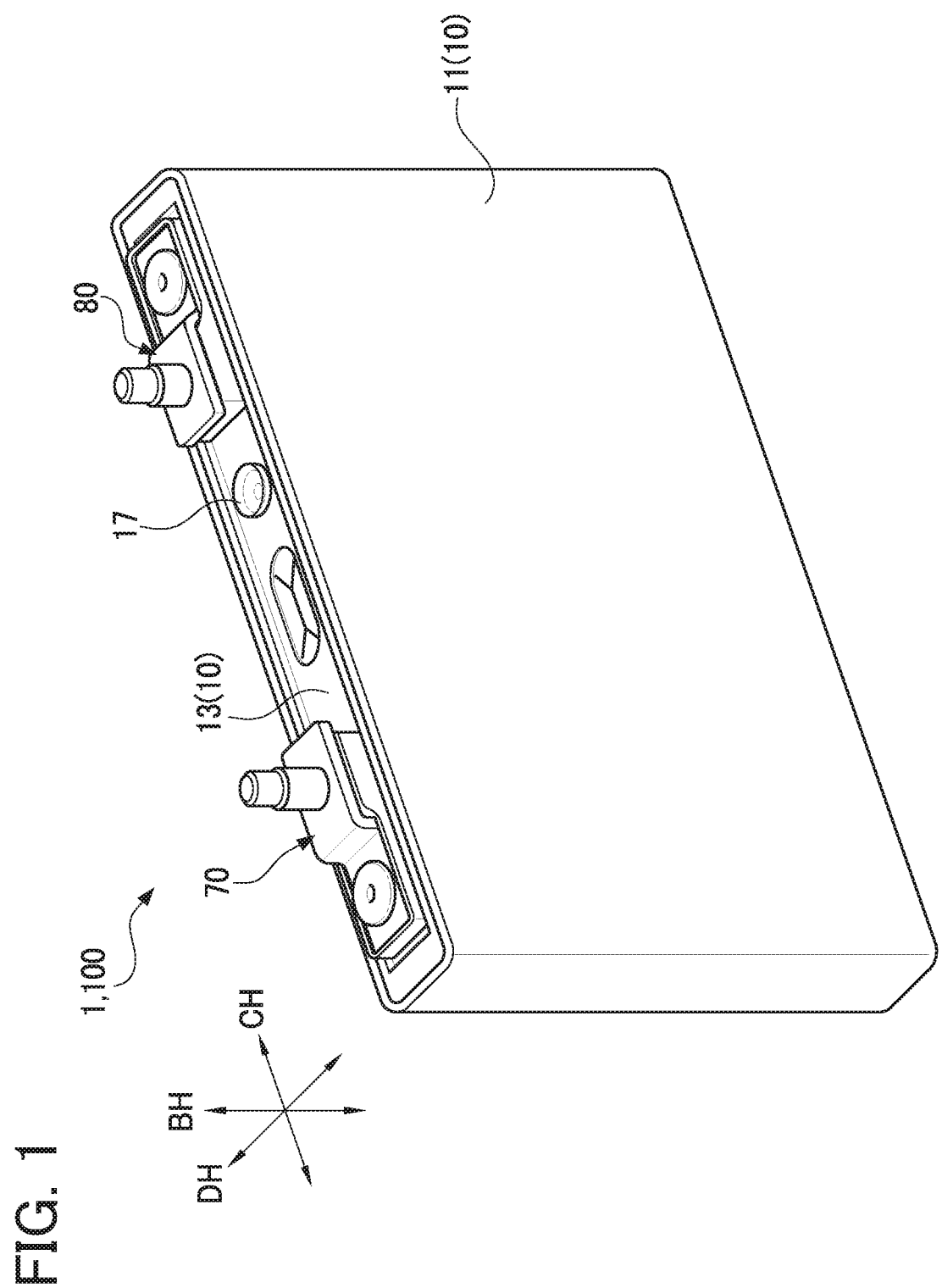
FIG. 1 is a perspective view of a battery in first and second embodiments.
Figure 2:
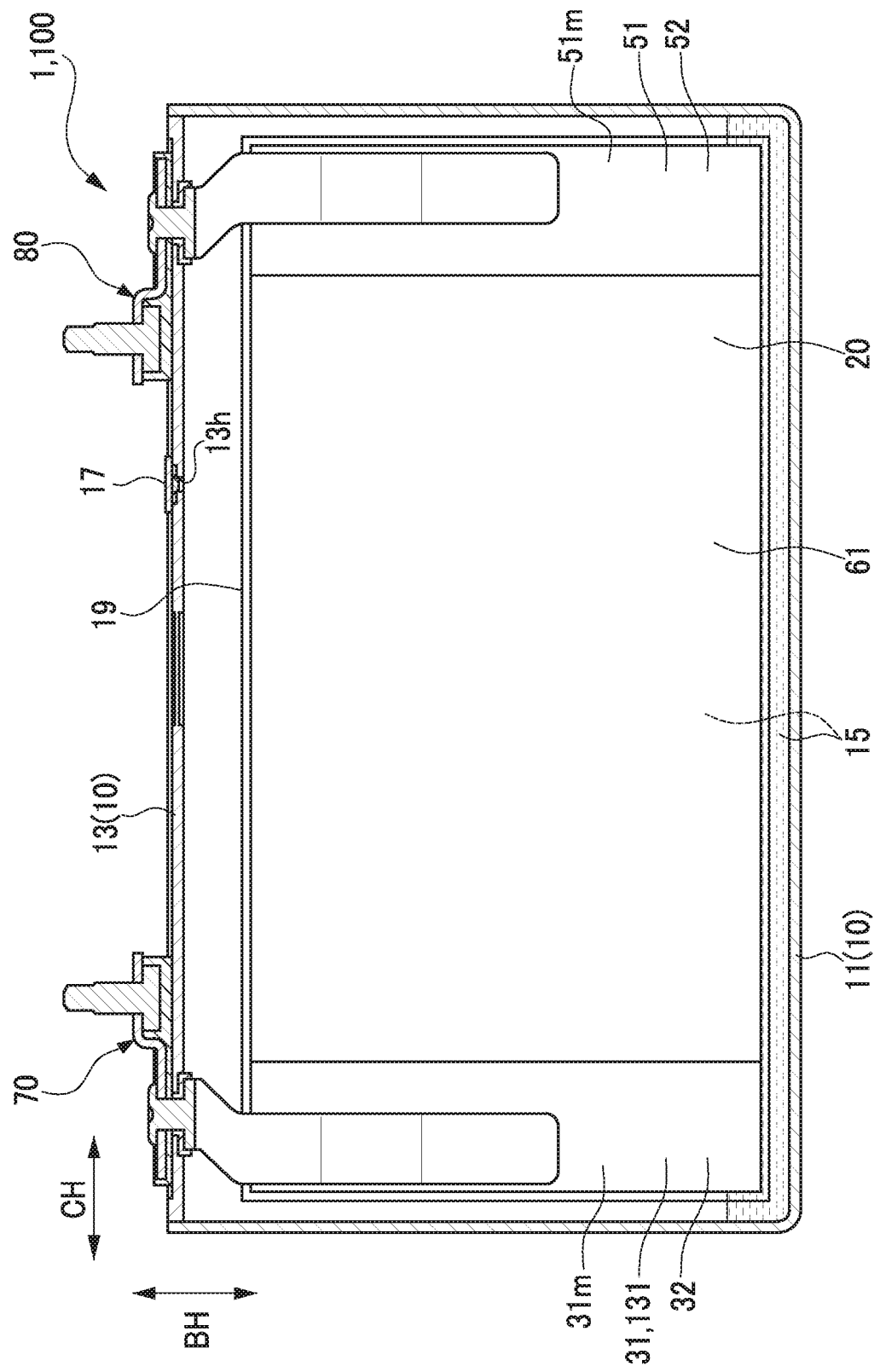
FIG. 2 is a longitudinal sectional view of the battery in the first and second embodiments.
Figure 3:
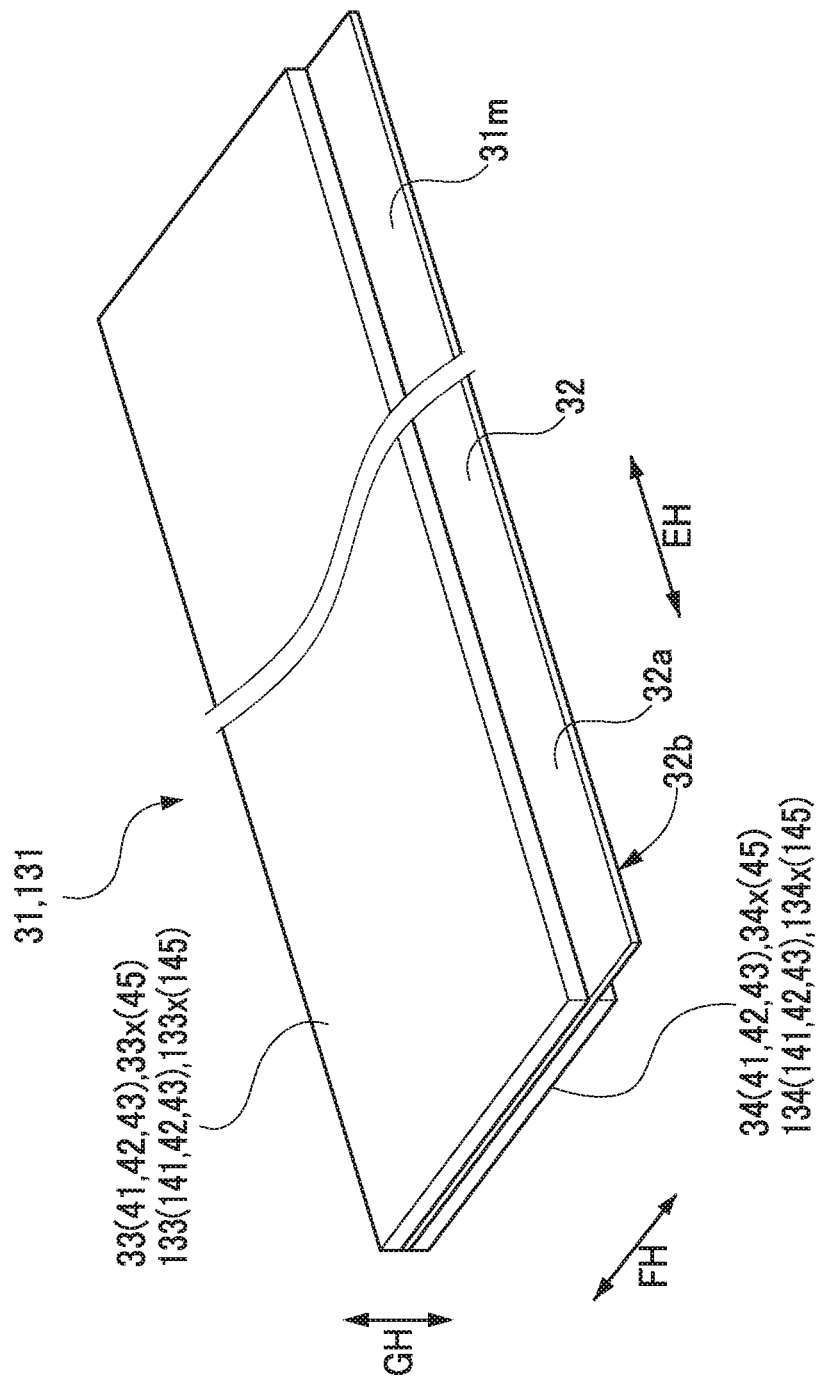
FIG. 3 is a perspective view of a positive electrode sheet in the first and second embodiments.

A detailed description of a first embodiment of the present disclosure will now be given referring to the accompanying drawings. FIGS. 1 and 2 are respectively a perspective view and a longitudinal sectional view of a lithium ion secondary battery (hereinafter, also simply referred to as a "battery") 1 in the first embodiment. FIG. 3 is a perspective view of a positive electrode sheet 31 constituting the battery 1. In the following description, a battery vertical direction BH, a battery lateral direction CH, and a battery thickness direction DH of the battery 1 are defined as indicated with corresponding arrows in FIGS. 1 and 2. Furthermore, a longitudinal direction EH, a width direction FH, and a thickness direction GH of the positive electrode sheet 31 are defined as indicated with corresponding arrows in FIG. 3.

The battery 1 is a rectangular sealed lithium ion secondary battery which will be mounted in a vehicle, such as a hybrid car, a plug-in hybrid car, and an electric vehicle. This battery 1 includes a battery case 10, an electrode body 20 contained in this battery case 10, a positive terminal member 70 and a negative terminal member 80 each supported in the battery case 10, and others. In the battery case 10, an electrolyte solution 15 is accommodated, a part of which is impregnated in the electrode body 20. This electrolyte 15 contains, as solute, lithium hexafluorophosphate ($LiPF_6$).

The battery case 10 is made of metal (aluminum in the first embodiment) in a rectangular parallelepiped box-like shape. This battery case 10 includes a case body member 11 having a bottom-closed tubular shape, rectangular in cross-section, with an opening only formed on an upper side, and a case lid member 13 having a rectangular plate-like shape welded to the opening of the case body member 11 to close the same. To the case lid member 13, the positive terminal member 70 made of aluminum is fixed in an insulated state from the case lid member 13. This positive terminal member 70 includes a portion that is connected and electrically conducted to a positive electrode exposed portion 31m of the positive electrode sheet 31 of the electrode body 20 in the battery case 10 and another portion that extends to the outside of the battery 1 through the case lid member 13. To the case lid member 13, furthermore, a negative terminal member 80 made of copper is also fixed in an insulated state from the case lid member 13. This negative terminal member 80 include a portion that is connected and electrically conducted to a negative electrode exposed portion 51m of a negative electrode sheet 51 of the electrode body 20 in the battery case 10 and another portion that extends to the outside of the battery 1 through the case lid member 13.

The electrode body 20 has a flat shape and is encased in a sideways position in the battery case 10. A sac-like insulative film envelop 19 made of an insulative film is placed between the electrode body 20 and the battery case 10. This electrode body 20 is formed in such a manner that a strip-shaped positive electrode sheet 31 and a strip-shaped negative electrode sheet 51 are overlapped by alternately interposing a pair of strip-shaped separators 61 each made of a resin porous film, and they are wound together about an axis and then compressed into a flat roll shape.

The positive electrode sheet 31 (also see FIG. 3) includes a positive current collecting foil 32 made of a strip-shaped aluminum foil. This positive current collecting foil 32 is formed, on its one-side main surface 32*a*, with a positive active material layer 33 in a strip-shaped region that is a part of the positive electrode sheet 31 in the width direction FH and extends in the longitudinal direction EH. Further, the positive current collecting foil 32 is also formed, on its an other-side main surface 32*b*, with a positive active material layer 34 in a strip-shaped region that is a part of the positive electrode sheet 31 in the width direction FH and extends in the longitudinal direction EH.

Figure 4:
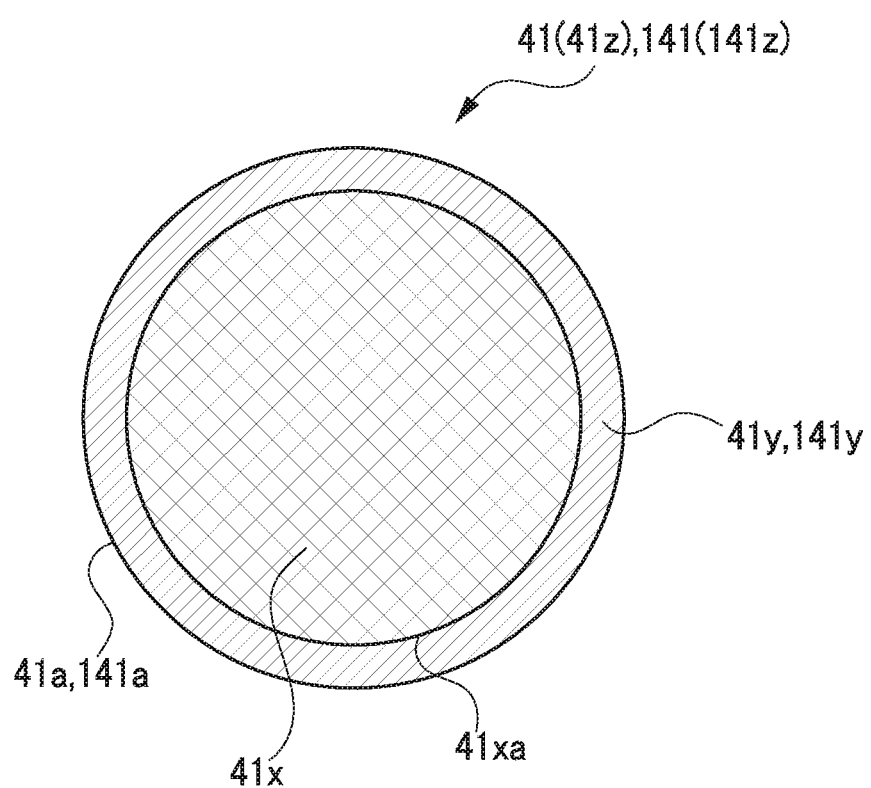
FIG. 4 is a cross-sectional view of a positive active material particle in the first and second embodiments.

The above positive active material layers 33 and 34 each include positive active material particles 41 made of lithium oxide that allows insertion and extraction of lithium ions, a conductive material 42, and a binder 43. In the first embodiment, the positive active material particles 41, lithium-nickel-cobalt-aluminum composite oxide particles having a layered rocksalt structure, concretely, $Li_{1.02}(Ni_{0.82}Co_{0.14}Al_{0.04})O_2$ particles are used. Particle surfaces 41*a* of the positive active material particles 41 are each formed with a phosphorus-containing coating 41*y* which is a coating that contains phosphorus (see FIG. 4). In the first embodiment, furthermore, acetylene black (AB) is used as the conductive material 42 and polyvinylidene fluoride (PVDF) is used as the binder 43. One of end portions of the positive electrode sheet 31 in the width direction FH forms a positive electrode exposed portion 31*m* formed of the positive current collecting foil 32 uncovered in the thickness direction GH in which the positive active material layers 33 and 34 are not present in the thickness direction GH. To this positive electrode exposed portion 31*m*, the foregoing positive terminal member 70 is welded.

The negative electrode sheet 51 includes a negative current collecting foil 52 made of a strip-shaped copper foil (see FIG. 2). This negative current collecting foil 52 is formed, on its one-side main surface, with a negative active material layer (not shown) in a strip-shaped region that is a part of the negative electrode sheet 51 in the width direction and extends in the longitudinal direction. Further, the negative current collecting foil 52 is also formed, on its other-side main surface, with a negative active material layer (not shown) in a strip-shaped region that is a part of the negative electrode sheet 51 in the width direction and extends in the longitudinal direction. The above negative active material layers each include negative active material particles, a binder, and a thickener. In the first embodiment, graphite particles are used as the negative active material particles, styrene-butadiene rubber is used as the binder, and carboxymethyl cellulose (CMC) is used as the thickener.

One of end portions of the negative electrode sheet 51 in the width direction forms a negative electrode exposed portion 51*m* formed of the negative current collecting foil 52 uncovered in the thickness direction in which the negative active material layers are not present in the thickness direction. To this negative electrode exposed portion 51*m*, the foregoing negative terminal member 80 is welded.

Figure 5:
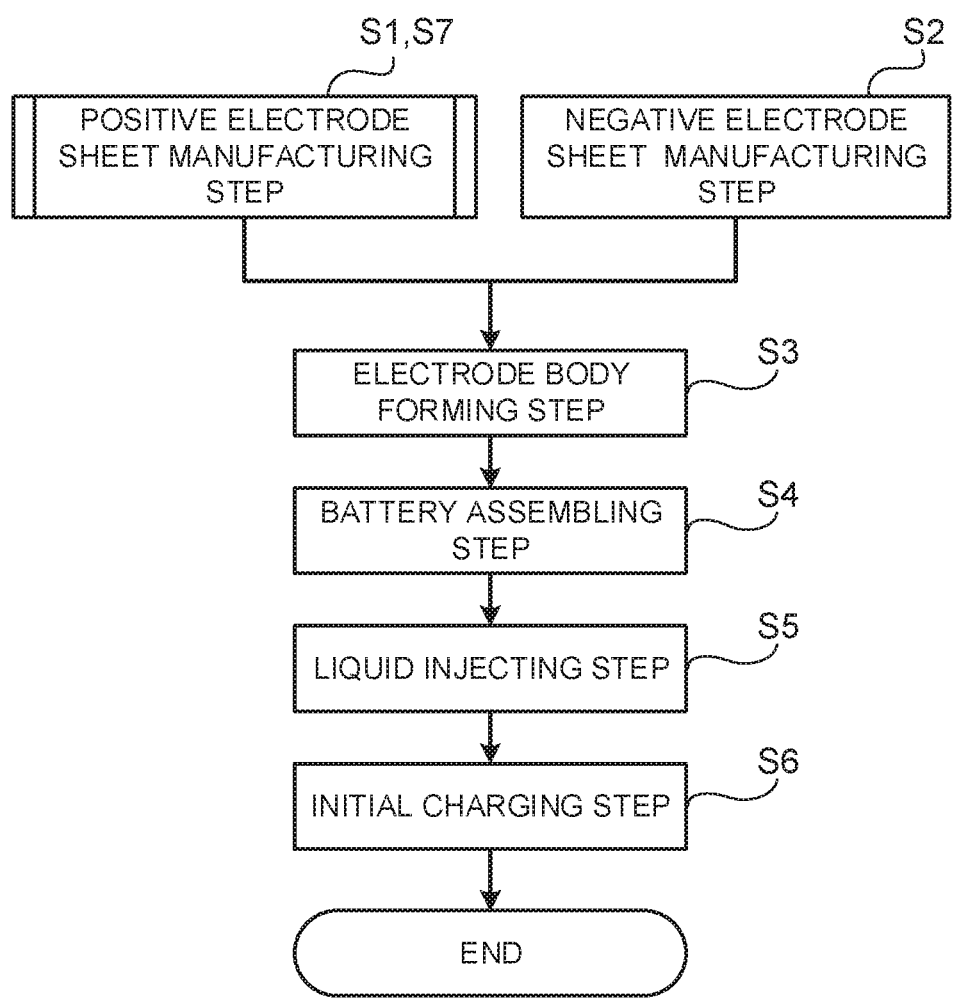
FIG. 5 is a flowchart showing a method for manufacturing the battery in the first and second embodiments.
Figure 6:
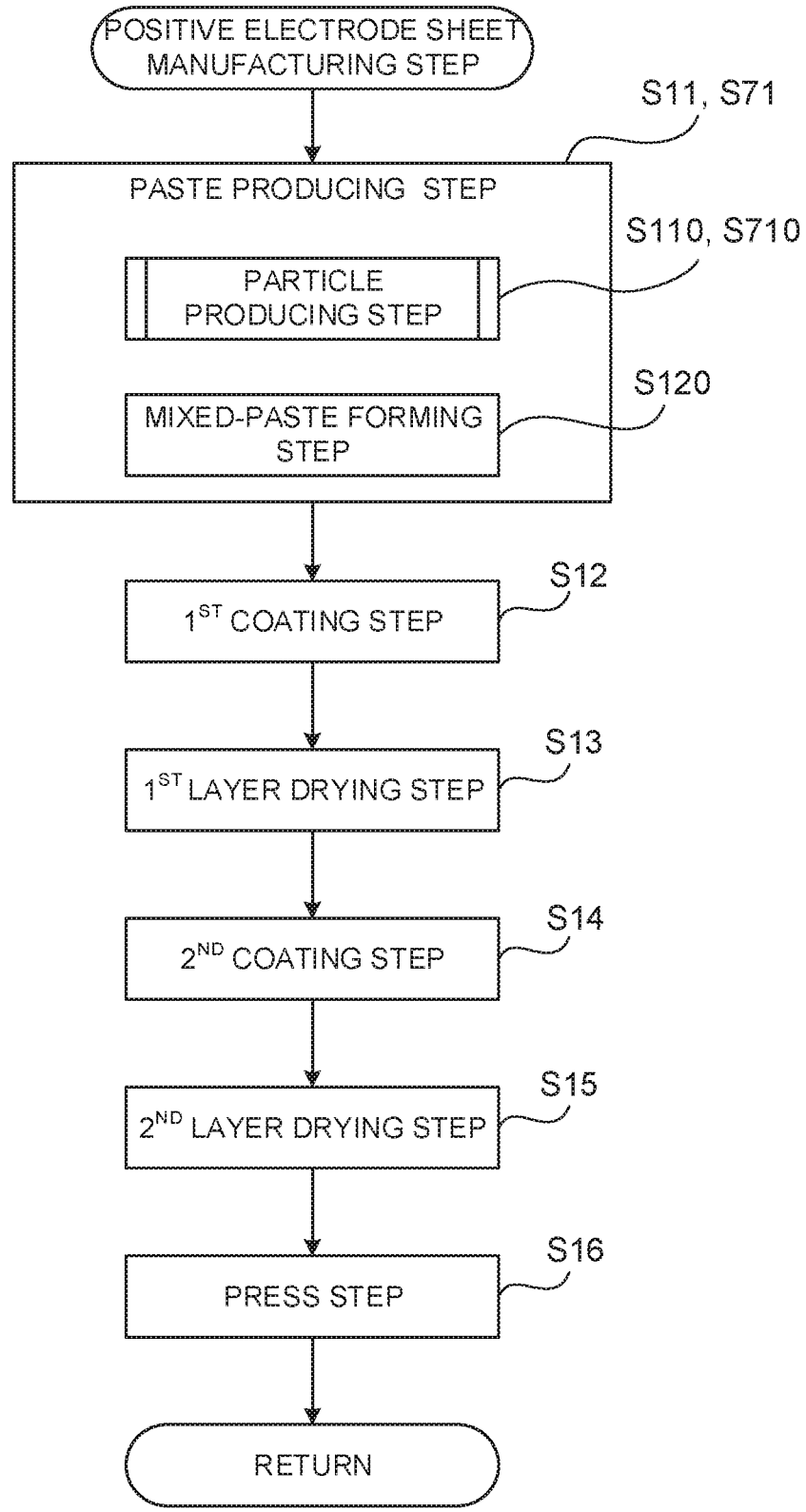
FIG. 6 is a flowchart showing a subroutine of a positive electrode sheet manufacturing step in the first and second embodiments.

Next, a method for manufacturing the aforementioned battery will be described (see FIGS. 5 to 7). In a positive electrode sheet manufacturing step S1 (see FIG. 5), specifically, in a paste producing step S11 (see FIG. 6), the positive active material particles 41 are produced at a particle producing step S110 (see FIG. 7).

In the particle producing step 5110, specifically, at a dissolving step S111, the phosphate compound is dissolved in the first dispersion medium to make a phosphate compound solution. In the first embodiment, inorganic phosphoric acid ($H_3PO_4$) and lithium phosphate ($Li_3PO_4$) which is a salt of inorganic phosphoric acid are used as the phosphate compound and water is used as the first dispersion medium. To be concretely, 10 grams of inorganic phosphoric acid and 90 grams of lithium phosphate are dissolved per 100 grams of water to prepare a phosphate compound solution having a pH of 4.0 to 5.2 (in the first embodiment, pH=5.0).

In a particle mixing step (corresponding to the foregoing contacting step) S112, subsequently, the aforementioned phosphate compound solution is brought into contact with untreated positive active material particles 41*x* (see FIG. 4), that is, the untreated positive active material particles 41*x* are mixed into the phosphate compound solution. In the first embodiment, as the untreated positive active material particles 41*x*, lithium-nickel-cobalt-aluminum composite oxide particles having a layered rocksalt structure, concretely, $Li_{1.02}(Ni_{0.82}Co_{0.14}Al_{0.04})O_2$ particles with an average particle diameter of 11 μm are used. The untreated positive active material particles 41*x* have the property that a dispersion liquid prepared by dispersing 1 gram of untreated positive active material particles 41*x* in 50 grams of water has a pH of 11.3 or higher (in the present embodiment, pH=11.6).

To be concrete, at an environmental temperature of 25° C., 120 grams of the untreated positive active material particles 41*x* are added per 100 grams of the phosphate compound solution, and agitated and mixed for one hour. Thus, the resistive materials (e.g., lithium carbonate) already formed on the particle surfaces 41*xa* of the untreated positive active material particles 41 are removed and further a coating that contains phosphorus, namely, the phosphorus-containing coating 41*y*, is formed on each particle surface 41*xa* of the untreated positive active material particles 41. The phosphorus-containing coating 41*y* in the first embodiment is conceived as a coating made of lithium phosphate ($Li_3PO_4$). In the first embodiment, the positive active material particles contained in the phosphate compound solution after undergoing the particle mixing step S112 correspond to contacted-undried positive active material particles 41*z* (positive active material particles having contacted with a phosphate compound solution but are not dried yet) which is mentioned above.

In a particle drying step S113, thereafter, the contacted-undried positive active material particles 41*z* wetted with the foregoing phosphate compound solution are subjected to drying. Thus, positive active material particles 41 formed with phosphorus-containing coatings 41*y* on the particle surfaces 41*xa* are obtained. To be concrete, a liquid mixture obtained in the particle mixing step S112 is filtrated to recover the contacted-undried positive active material particles 41*z*. Then, the contacted-undried positive active material particles 41*z* are dried by heating with hot air at 150° C. or less (130° C. in the first embodiment). Thus, the positive active material particles 41 are produced.

After that, the positive active material particles 41 are sifted to obtain positive active material particles 41 each having a predetermined particle diameter or smaller. In the above manner, the positive active material particles 41 including the phosphorus-containing coatings 41y at the particle surfaces 41a are produced.

In the paste producing step S11 (see FIG. 6), at a mixed-paste forming step S120, the positive active material particles 41 produced in the above particle producing step S110 and a second dispersion medium are mixed to produce a positive electrode paste 45. In the first embodiment, N-Methyl-2-Pyrolidon (NMP) is used as the second dispersion medium. The positive electrode paste 45 also contains the conductive material 42 (AB in the first embodiment) and the binder 43 (PVDF in the first embodiment). To be concrete, the positive active material particles 41, the conductive material 42, and the binder 43 are kneaded with NMP at a weight mix ratio of the positive active material particles 41, the conducting material 42, and the binder 43 of 93:6:1 so that a solid content percentage NV of the positive electrode paste 45 is 70 wt % (a percentage of NMP is 30 wt %). In this manner, the positive electrode paste 45 is produced.

In a first coating step S12 (see FIG. 6), the positive electrode paste 45 produced in the aforementioned paste producing step S11 is applied by die-coating onto the one-side main surface 32a of the positive current collecting foil 32, separately prepared, to form an undried active material layer 33x.

In a first layer drying step S13, the undried active material layer 33x on the positive current collecting foil 32 is dried to form a positive active material layer 33. More concretely, the positive current collecting foil 32 formed with the undried active material layer 33x is delivered into a heating-drying furnace and then hot air is blown against the undried active material layer 33x to heat and dry the undried active material layer 33x. Thus, the positive active material layer 33 is formed.

In a second coating step S14, the foregoing positive electrode paste 45 is applied onto the other-side main surface 32b of the positive current collecting foil 32 to form an undried active material layer 34x.

In a second layer drying step S15, the undried active material layer 34x on the other-side main surface 32b of the positive current collecting foil 32 is dried to form a positive active material layer 34. To be concrete, the positive current collecting foil 32 formed with the undried active material layer 34x on the main surface 32b is delivered into a heating-drying furnace and then hot air is blown against the undried active material layer 34x to heat and dry the undried active material layer 34x. Thus, the positive active material layer 34 is formed.

In a press step S16, this positive electrode plate (i.e., the positive current collecting foil 32 formed with the positive active material layers 33 and 34 on the corresponding main surfaces 32a and 32b) is pressed by a roll press machine (not shown) to increase the density of each of the positive active material layers 33 and 34. Thus, the positive electrode sheet 31 is manufactured.

In a negative electrode sheet manufacturing step S2 (see FIG. 5), in a separate way, the negative electrode sheet 51 is manufactured. More concretely, negative active material particles (graphite particles in the first embodiment), a binder (SBR in the first embodiment), and a thickener (CMC in the first embodiment) are kneaded with a dispersion medium (water in the first embodiment) to produce a negative electrode paste. This negative electrode paste is applied by die-coating onto a one-side main surface of the negative current collecting foil 52 to form an undried active material layer (not shown), and then this undried active material layer is dried by heating with hot air, thereby forming a negative active material layer (not shown). Similarly, the negative electrode paste is applied onto the other-side main surface of the negative current collecting foil 52 to form an undried active material layer (not shown), and then this undried active material layer is dried by heating, thereby forming a negative active material layer (not shown). Thereafter, this negative electrode plate (i.e., the negative current collecting foil 52 formed with the negative active material layers on the corresponding main surfaces) is pressed by a roll press machine (not shown) to increase the density of each of the negative active material layers. Thus, the negative electrode sheet 51 is manufactured.

In an electrode body forming step S3, the electrode body 20 is formed. More concretely, the positive electrode sheet 31 and the negative electrode sheet 51 are overlapped one another by alternately interposing one of two separates 61, and they are wound together around a winding core and then compressed into a flat roll shape to produce a flat wound electrode body 20 (see FIG. 2).

In a battery assembling step S4, the battery 1 is assembled. To be concrete, the case lid member 13 is prepared, and the positive terminal member 70 and the negative terminal member 80 are fixed to this case lid member 13 (see FIGS. 1 and 2). Then, the positive terminal member 70 and the negative terminal member 80 are respectively welded to the positive electrode exposed portion 31m of the positive electrode sheet 31 and the negative electrode exposed portion 51m of the negative electrode sheet 51 in the electrode body 20. Successively, the electrode body 20 is put in the insulative film envelope 19 and inserted together into the case body member 11. The opening of the case body member 11 is then closed with the case lid member 13. The case body member 11 and the case lid member 13 are welded to each other, so that the battery case 10 is made up.

In a liquid injecting step S5, the electrolyte 15 is injected into the battery case 10 through a liquid inlet 13h so that the electrode body 20 is impregnated with the electrolyte 15. Thereafter, the liquid inlet 13h is sealed with a sealing member 17.

In an initial charging step S6, the battery 1 undergoes initial charging. This battery 1 is then subjected to various tests or inspections. In the above manner, the battery 1 is completed.

In the first embodiment, as described above, since the particle mixing step S112 and the particle drying step S113 are performed, the resistive materials (lithium carbonate) already formed on the particle surfaces 41xa of the untreated positive active material particles 41x can be removed. Further, the positive active material particles 41 including the phosphorus-containing coatings 41y at the particle surfaces 41a can be obtained. Those positive active material particles 41 are less likely to react with water and carbon dioxide in the air as compared with positive active material particles not formed with phosphorus-containing coatings 41y at particle surfaces. Accordingly, lithium carbonate ($Li_2CO_3$) which forms a resistive material is unlikely to be formed on the particle surfaces 41a of the positive active material particles 41. Furthermore, the positive active material particles 41 are less likely to react with water as compared with the positive active material particles not formed with the phosphorus-containing coatings 41y at the particle surfaces. This can suppress release of lithium ions from the positive active material particles 41 due to reaction with water and thus prevent changes in the crystal structure of the positive active material particles 41. Accordingly, when the positive electrode paste 45 is made by using the positive active material particles 41, the positive electrode sheet 31 is formed by using the positive electrode paste 45, and finally the battery 1 is manufactured by using the positive electrode sheet 31, this battery 1 can reduce the IV resistance as compared with a battery manufactured by using the positive active material particles not formed with the phosphorus-containing coatings 41y at the particle surfaces.

In the first embodiment, moreover, the phosphate compound is at least inorganic phosphoric acid selected from inorganic phosphoric acid and a salt of inorganic phosphoric acid, that is, the phosphate compound is either inorganic phosphoric acid or a combination of inorganic phosphoric acid and a salt of inorganic phosphoric acid (the first embodiment employs a combination of inorganic phosphoric acid and lithium phosphate), and the first dispersion medium is water. In this case, the lower the pH of the phosphate compound solution before contacting with the untreated positive active material particles 41x is, the more greatly the positive active material particles 41 are damaged by acid in the particle mixing step S112 and subsequent steps. To be concrete, it has been found that lithium ions are eluted out of the positive active material particles 41, causing irreversible changes in crystal structure of the positive active material particles 41. When the pH of the phosphate compound solution before contacting with the untreated positive active material particles 41x is set too high, the salt of inorganic phosphoric acid (the first embodiment employs lithium phosphate) is deposited in granular form into the phosphate compound solution.

In the first embodiment, in contrast, the pH of the phosphate compound solution before contacting with the untreated positive active material particles 41x is set to 4.0 to 5.2 (5.0 in the first embodiment). When the pH of the phosphate compound solution is adjusted to 4.0 or higher, as compared with a case where the pH is less than 4.0, it is possible to suppress the positive active material particles 41 from being greatly damaged by acid in the particle mixing step S112 and subsequent steps. On the other hand, when the pH of the phosphate compound solution is adjusted to 5.2 or lower, it is possible to prevent the salt of inorganic phosphoric acid (lithium phosphate) from being deposited in granular form into the phosphate compound solution.

Furthermore, the untreated positive active material particles 41x used in the first embodiment are positive active material particles having the property that a dispersion liquid prepared by dispersing 1 gram of untreated positive active material particles 41x in 50 grams of water has a pH of 11.3 or higher. Such untreated positive active material particles 41x are particularly likely to react with water and carbon dioxide to thereby generate lithium hydroxide and further produce lithium carbonate. In a battery manufactured by directly using those untreated positive active material particles 41x, the IV resistance tends to become high. Therefore, the phosphorus-containing coatings at the particle surfaces 41a of the positive active material particles 41 may be especially provided to suppress the positive active material particles 41 from reacting with water and carbon dioxide.

Second Embodiment

Next, a second embodiment will be described below. The first embodiment uses inorganic phosphoric acid and a salt of inorganic phosphoric acid (lithium phosphate) as the phosphate compound. In contrast, the second embodiment uses only inorganic phosphoric acid as the phosphate compound.

In the first embodiment, in the particle producing step S110, the particle drying step S113 is performed after the particle mixing step S112 to produce the positive active material particles. In the second embodiment, differently from the first embodiment, in a particle producing step S710, an alkali mixing step (corresponding to the foregoing alkali adding step) S715 is additionally performed after the particle mixing step S112 and before the particle drying step S113 as indicated with a broken line in FIG. 7.

Figure 7:
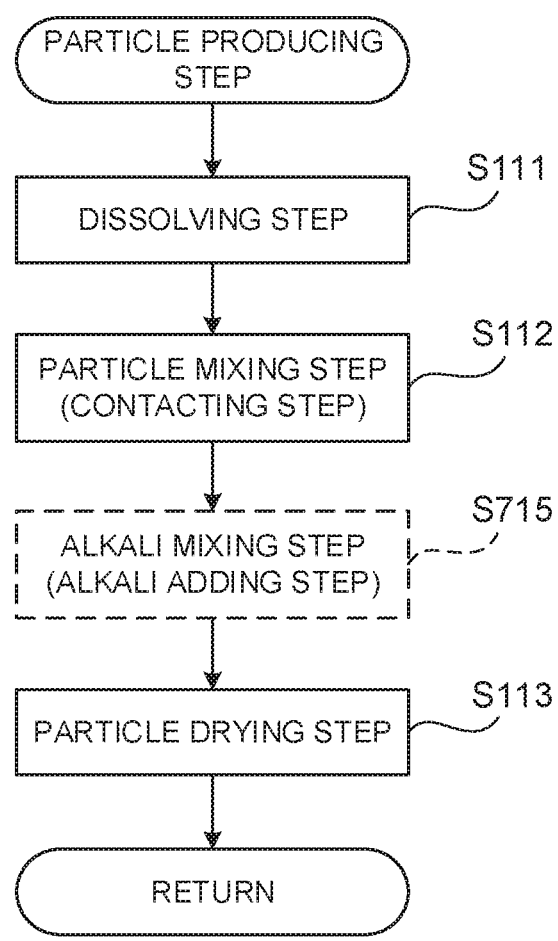
FIG. 7 is a flowchart showing a subroutine of a particle producing step in the first and second embodiments.

In the second embodiment, concretely, in a positive electrode sheet manufacturing step S7 (see FIG. 5), specifically, in a paste producing step S71 (see FIG. 6), positive active material particles 141 are produced at the particle producing step S710 (see FIG. 7). Specifically, in the dissolving step 5111, by use of only inorganic phosphoric acid ($H_3PO_4$) as the phosphate compound, 100 grams of inorganic phosphoric acid is dissolved per 100 grams of the first dispersion medium (water also in the second embodiment) to prepare a phosphate compound solution having a pH of 3.0.

In the particle mixing step (a contacting step) S112, the untreated positive active material particles 41x (see FIG. 4) identical to those in the first embodiment are added and mixed into the phosphate compound solution as in the first embodiment. Accordingly, it is considered that the resistive materials (e.g., lithium carbonate) already formed on the particle surfaces 41xa of the untreated positive active material particles 41x are removed and a coating that contains phosphorus, i.e., a phosphorus-containing coating 141y, is formed on each of the particle surfaces 41xa of the untreated positive active material particles 41x. It is further considered that the phosphorus-containing coatings 141y in the second embodiment are also coatings made of lithium phosphate ($Li_3PO_4$).

In the second embodiment, thereafter, in the alkali mixing step S715, an alkali aqueous solution is added to the foregoing phosphate compound solution to form a mixed solution with a pH of 5.2 or higher. Concretely, the alkali aqueous solution is prepared by dissolving lithium hydroxide (LiOH) in water. This alkali aqueous solution is added and mixed to the phosphate compound solution containing the untreated positive active material particles 41x so that the pH of the mixed solution is 5.2 or higher (pH=11.5 in the second embodiment). In the second embodiment, the positive active material particles contained in the phosphate compound solution prepared in the alkali mixing step S715 correspond to the foregoing contacted-undried positive active material particles 141z.

In the particle drying step S113, the contacted-undried positive active material particles 141z wetted with the foregoing phosphate compound solution are subjected to drying, as in the first embodiment, to obtain the positive active material particles 141 formed with the phosphorus-containing coatings 141y at the particle surfaces 141a. In the above manner, the positive active material particles 141 are produced.

Subsequently, as in the first embodiment, a positive electrode paste 145 is produced by using the foregoing positive active material particles 141. A positive electrode sheet 131 is manufactured by using the positive electrode paste 145. Further, a battery 100 is manufactured by using this positive electrode sheet 131. Specifically, in the mixed-paste forming step S120 (see FIG. 6), the positive active material particles 141 and the second dispersion medium (NMP also in the second embodiment) are mixed to make the positive electrode paste 145. In the first coating step S12, thereafter, the positive electrode paste 145 is applied onto a one-side main surface 32a of the positive current collecting foil 32 to form an undried active material layer 133x. In the first layer drying step S13, the undried active material layer 133x is dried to form a positive active material layer 133.

In the second coating step S14, the positive electrode paste 145 is also applied onto the other-side main surface 32b of the positive current collecting foil 32 to form an undried active material layer 134x. In the second layer drying step S15, the undried active material layer 134x is dried to form a positive active material layer 134. In the press step S16, thereafter, the positive electrode sheet 131 is pressed to increase the density of each of the positive active material layers 133 and 134. Thus, the positive electrode sheet 131 is manufactured.

In the negative electrode sheet manufacturing step S2 (see FIG. 5), in a separate way, the negative electrode sheet 51 is manufactured as in the first embodiment. In the electrode body forming step S3, the positive electrode sheet 131, the negative electrode sheet 51, and two separators 61 are formed into the electrode body 20. In the battery assembling step S4, the liquid injecting step S5, and the initial charging step S6 are performed as in the first embodiment to manufacture the battery 100.

In the second embodiment, similarly, the particle mixing step (contacting step) S112 and the particle drying step S113 are performed, thereby enabling removal of the resistive materials (lithium carbonate) already formed on the particle surfaces 41xa of the untreated positive active material particles 41x. Further, the positive active material particles 141 including the phosphorus-containing coatings 141y at the particle surfaces 141a can be obtained. The positive active material particles 141 are also less likely to react with water as compared with the positive active material particles not formed with the phosphorus-containing coatings 141y at the particle surfaces. This can suppress release of lithium ions from the positive active material particles 141 due to reaction with water and thus prevent changes in the crystal structure of the positive active material particles 141. Accordingly, when the positive electrode paste 145 is produced by using the positive active material particles 14, the positive electrode sheet 131 is manufactured by using the positive electrode paste 145, and further the battery 100 is manufactured by using the positive electrode sheet 131, this battery 100 can reduce the IV resistance as compared with a battery manufactured by using the positive active material particles not formed with the phosphorus-containing coatings 141y at the particle surfaces.

In the second embodiment, furthermore, the phosphate compound is inorganic phosphoric acid and the first dispersion medium is water. Therefore, the phosphate compound solution before contacting with the untreated positive active material particles 41x has a low pH. As described above, the lower the pH of the phosphate compound solution is, the more greatly the positive active material particles are damaged by acid in the particle mixing step S112 and subsequent steps, that is, lithium ions are eluted, resulting in irreversible variations in the crystal structure. In the second embodiment, in contrast, after the particle mixing step S112 and before the particle drying step S113, the alkali aqueous solution is added in the alkali mixing step (the alkali adding step) S715 to form the mixed solution with a pH of 5.2 or higher. This can suppress the positive active material particles 141 from being greatly damaged by acid in the particle mixing step S112 and subsequent steps as compared with the case of not performing the alkali mixing step S715. In addition, the same operations and effects as those in the first embodiment can be achieved for the same parts or manners as in the first embodiment.

EXAMPLES AND COMPARATIVE EXAMPLES

Next, results of experiments carried out to verify the advantageous effects of the present disclosure will be described below. The battery 1 of the first embodiment is prepared in Example 1 and the battery 100 of the second embodiment is prepared in Example 2.

On the other hand, in Comparative example 1, positive active material particles not formed with the phosphorus-containing coatings 41y or 141y, that is, the untreated positive active material particles 41x of the first or second embodiment are directly subjected to the paste producing step S11 to make a positive electrode paste. Except for this, a battery is manufactured in the same manner as in the first embodiment.

In Comparative example 2, in the paste producing step S11, positive active material particles not formed with the phosphorus-containing coatings 41y or 141y (i.e., the untreated positive active material particles 41x) are directly used and also 1 gram of lithium phosphate ($Li_3PO_4$) is mixed per 100 grams of the positive active material particles (the untreated positive active material particles 41x) to make a positive electrode paste. Then, a battery is manufactured by using this positive electrode paste. Specifically, differently from the first embodiment using lithium phosphate ($Li_3PO_4$) in the process of producing the positive active material particles 41 (the particle producing step S110), Comparative example 2 uses lithium phosphate in the process of mixing the positive electrode paste (the mixed-paste forming step S120).

Furthermore, ten batteries in each of Examples 1 and 2 and Comparative examples 1 and 2 undergo measurement of IV resistance R. To be concrete, each battery adjusted to 50% SOC (state of charge) is discharged at an environment temperature of 25° C. and at a discharge current value (I) of 5 C for 5 seconds. After that, the battery voltage V1 at the start of discharge and the battery voltage V2 after a lapse of 5 seconds from the start of discharge are each measured. The IV resistance R of each battery is then calculated by the following expression:

$$R=(V1-V2)/I.$$

Figure 8:
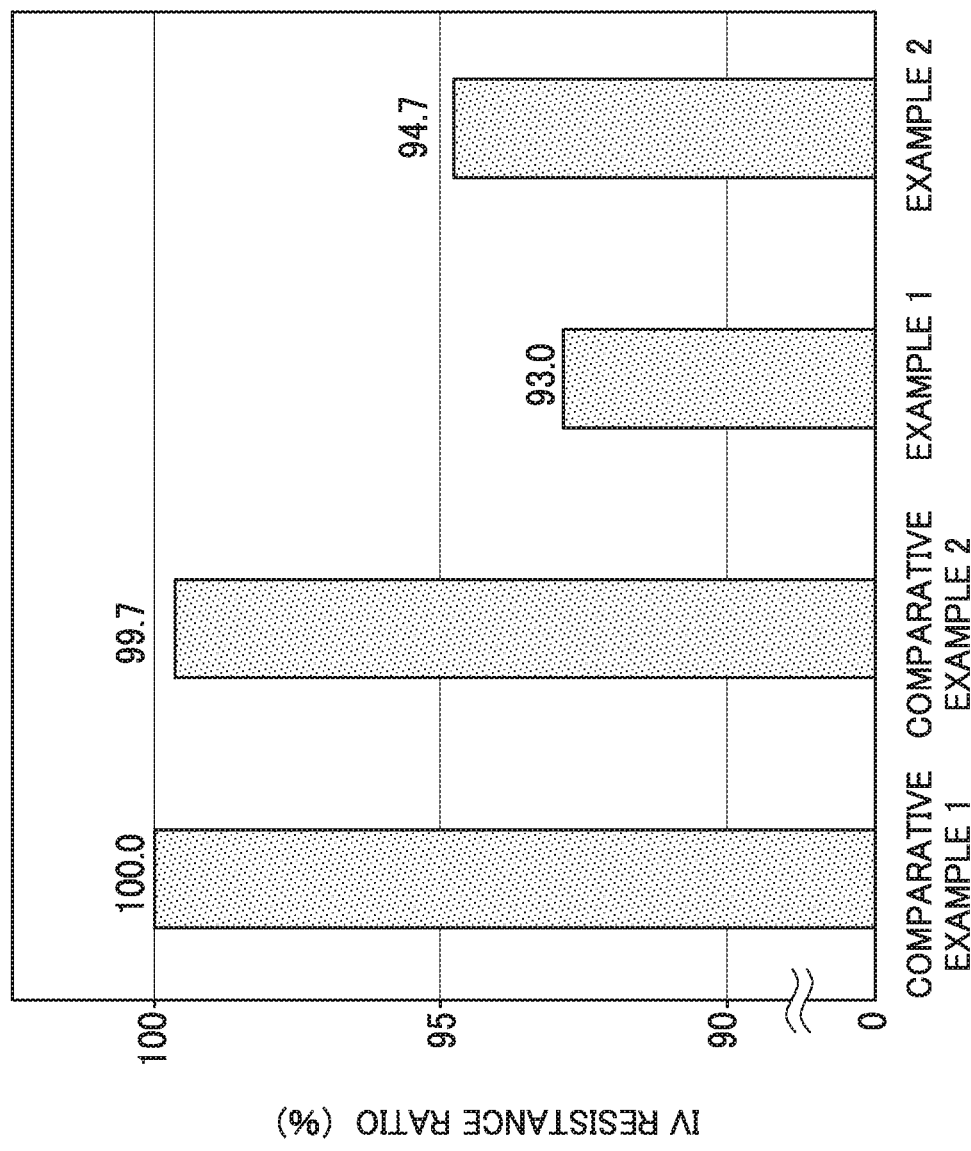
FIG. 8 is a graph showing an IV resistance ratio in each battery in Examples 1 and 2 and Comparative examples 1 and 2.

Furthermore, with reference to an IV resistance value (an average value) (=100%) of the battery in Comparative example 1, an IV resistance ratio (an average value) of each battery in Examples 1 and 2 and Comparative example 2 are calculated. Those results are shown in FIG. 8.

In the battery 1 in Example 1 and the battery 100 in Example 2 are both lower in IV resistance (Example 1: 93.0%, Example 2: 94.7%) than the batteries in Comparative examples 1 and 2. It can be considered that these results are obtained for the following reasons. In Comparative example 1, specifically, the particle mixing step (the contacting step) S112 and the particle drying step S113 are not performed. Thus, resistive materials such as lithium carbonate remain on the particle surfaces 41xa of the positive active material particles (i.e., the untreated positive active material particles 41x), and besides, the phosphorus-containing coatings 41y or 141y are not formed on those particle surfaces 41xa.

In Comparative example 2, similarly, the particle mixing step S112 and the particle drying step S113 are not performed and thus resistive materials such as lithium carbonate remain on the particle surfaces 41xa of the positive active material particles (i.e., the untreated positive active material particles 41x), and besides, the phosphorus-containing coatings 41y or 141y are not formed. In Comparative example 2, furthermore, in the process of mixing the positive electrode paste (the mixed-paste forming step S120), lithium phosphate is added into the positive electrode paste. However, the phosphorus-containing coatings 41y or 141y are not formed on the particle surfaces 41xa of the positive active material particles (the untreated positive active material particles 41x) simply by adding lithium phosphate to the positive electrode paste.

In Comparative examples 1 and 2, therefore, in the process of manufacturing a battery, the positive active material particles (the untreated positive active material particles 41x) contact and react with water in the air, thereby generating lithium hydroxide ($Li_2O+H_2O \rightarrow 2LiOH$) on the particle surfaces 41xa. Furthermore, this lithium hydroxide reacts with carbon dioxide in the air to thereby generate lithium carbonate ($2LiOH+CO_2 \rightarrow Li_2CO_3+H_2O$). The lithium carbonate generated on the particle surfaces 41xa of the positive active material particles (the untreated positive active material particles 41x) is a resistive material. When the positive active material particles (the untreated positive active material particles 41x) react with water and thus lithium ions are moved out of the positive active material particles (the untreated positive active material particles 41x), the crystal structure of the positive active material particles (the untreated positive active material particles 41x) changes, making it difficult to insertion and extraction of lithium ions with respect to the positive active material particles (the untreated positive active material particles 41x). It is consequently conceived that the IV resistance R has been raised in Comparative examples 1 and 2.

In Examples 1 and 2, in contrast, the particle mixing step (the contacting step) S112 and the particle drying step S113 are performed to remove the resistive materials from the particle surfaces 41xa of the untreated positive active material particles 41x and also the phosphorus-containing coatings 41y or 141y are formed on the particle surfaces 41xa. Such positive active material particles 41 or 141 make it difficult for water and carbon dioxide in the air to contact with the positive active material particles. Accordingly, in the process of manufacturing a battery, it is possible to suppress the generation of lithium hydroxide and hence lithium carbonate on the particle surfaces 41a or 141a of the positive active material particles 41 or 141 due to contact with water and carbon dioxide in the air and prevent the changes in the crystal structure in the particle surfaces 41a or 141a. On this account, it is conceived that an IV resistance ratio (an IV resistance R) in each of the battery 1 in Example 1 and the battery 100 in Example 2 is lower than the IV resistance ratio of each battery in Comparative examples 1 and 2.

The present disclosure is described in the foregoing first and second embodiments; however, the present disclosure is not limited to the first and second embodiments and may be appropriately embodied in other specific forms without departing from the essential characteristics thereof.

For instance, the first and second embodiments use lithium-nickel-cobalt-aluminum composite oxide particles as the untreated positive active material particles 41x, but not limited thereto. As an alternative, the untreated positive active material particles 41x may be selected from for example lithium-nickel-cobalt-manganese composite oxide particles, olivine-type lithium iron phosphate particles, and spinel-type lithium manganese oxide particles.

The first and second embodiments exemplify the configuration in which inorganic phosphoric acid and a salt of inorganic phosphoric acid (lithium phosphate) are used as the phosphate compound (First embodiment) and the configuration in which only inorganic phosphoric acid is used as the phosphate compound (Second embodiment). However, the present disclosure is not limited to those configurations. For instance, the phosphate compound may be selected from organic phosphoric acid such as phenylphosphonic acid and methylphosphonic acid, and a salt of phenylphosphonic acid and a salt of methylphosphonic acid (lithium salt, etc.).

REFERENCE SIGNS LIST

1, 100 Lithium ion secondary battery (Battery)
20 Electrode body
31, 131 Positive electrode sheet
32 Positive current collecting foil
33, 34, 133, 134 Positive active material layer
33x, 34x, 133x, 134x Undried active material layer
41, 141 Positive active material particle
41a, 141a Particle surface (of Positive active material particle)
41x Untreated positive active material particle
41z, 141z Contacted-undried positive active material particle
41xa Particle surface (of Untreated positive active material particle)
41y, 141y Phosphorus-containing coating
45, 145 Positive electrode paste
51 Negative electrode sheet
S1, S7 Positive electrode sheet manufacturing step
S4 Battery assembling step
S11, S71 Paste producing step
S110, S710 Particle producing step
S120 Mixed-paste forming step
S12 First coating step
S13 First layer drying step
S14 Second coating step
S15 Second layer drying step
S111 Dissolving step
S112 Particle mixing step (Contacting step)
S715 Alkali mixing step (Alkali adding step)
S113 Particle drying step

What is claimed is:

1. A method for producing positive active material particles that allow insertion and extraction of a lithium ion, the method comprising:

a contacting step of bringing a phosphate compound solution into contact with untreated positive active material particles, the phosphate compound solution being prepared by dissolving a phosphate compound into a first dispersion medium, and the phosphate compound being at least one of inorganic phosphoric acid ($H_3PO_4$), a salt of inorganic phosphoric acid, organic phosphoric acid, and a salt of organic phosphoric acid; and a particle drying step, after the contacting step, of drying contacted-undried positive active material particles wetted with the phosphate compound solution to obtain the positive active material particles each formed with a coating that contains phosphorus on a particle surface.

2. The method for producing positive active material particles according to claim 1, wherein
the phosphate compound is either inorganic phosphoric acid or a combination of inorganic phosphoric acid and a salt of inorganic phosphoric acid,
the first dispersion medium is water, and
the phosphate compound solution before contacting with the untreated positive active material particles has a pH of 4.0 to 5.2.

3. The method for producing positive active material particles according to claim 1, wherein
the phosphate compound is inorganic phosphoric acid,
the first dispersion medium is water, and
the method further comprises an alkali adding step of adding an alkali aqueous solution to the phosphate compound solution to adjust a pH of the phosphate compound solution to 5.2 or higher, the alkali adding step being performed after the contacting step and before the particle drying step.

4. The method for producing positive active material particles according to claim 1, wherein the untreated positive active material particles have a property that a dispersion liquid prepared by dispersing 1 gram of the untreated positive active material particles in 50 grams of water has a pH of 11.3 or higher.

5. The method for producing positive active material particles according to claim 2, wherein the untreated positive active material particles have a property that a dispersion liquid prepared by dispersing 1 gram of the untreated positive active material particles in 50 grams of water has a pH of 11.3 or higher.

6. The method for producing positive active material particles according to claim 3, wherein the untreated positive active material particles have a property that a dispersion liquid prepared by dispersing 1 gram of the untreated positive active material particles in 50 grams of water has a pH of 11.3 or higher.

7. A method for producing positive electrode paste including: positive active material particles that allow insertion and extraction of a lithium ion; and a second dispersion medium, the method comprising:
a particle producing step of producing the positive active material particles by the positive active material particle producing method according to claim 1; and
a mixed-paste forming step of mixing the positive active material particles and the second dispersion medium to produce the positive electrode paste.

8. A method for producing positive electrode paste including: positive active material particles that allow insertion and extraction of a lithium ion; and a second dispersion medium, the method comprising:
a particle producing step of producing the positive active material particles by the positive active material particle producing method according to claim 2; and
a mixed-paste forming step of mixing the positive active material particles and the second dispersion medium to produce the positive electrode paste.

9. A method for producing positive electrode paste including: positive active material particles that allow insertion and extraction of a lithium ion; and a second dispersion medium, the method comprising:
a particle producing step of producing the positive active material particles by the positive active material particle producing method according to claim 3; and
a mixed-paste forming step of mixing the positive active material particles and the second dispersion medium to produce the positive electrode paste.

10. A method for producing positive electrode paste including: positive active material particles that allow insertion and extraction of a lithium ion; and a second dispersion medium, the method comprising:
a particle producing step of producing the positive active material particles by the positive active material particle producing method according to claim 4; and
a mixed-paste forming step of mixing the positive active material particles and the second dispersion medium to produce the positive electrode paste.

11. A method for producing positive electrode paste including: positive active material particles that allow insertion and extraction of a lithium ion; and a second dispersion medium, the method comprising:
a particle producing step of producing the positive active material particles by the positive active material particle producing method according to claim 5; and
a mixed-paste forming step of mixing the positive active material particles and the second dispersion medium to produce the positive electrode paste.

12. A method for producing positive electrode paste including: positive active material particles that allow insertion and extraction of a lithium ion; and a second dispersion medium, the method comprising:
a particle producing step of producing the positive active material particles by the positive active material particle producing method according to claim 6; and
a mixed-paste forming step of mixing the positive active material particles and the second dispersion medium to produce the positive electrode paste.

13. A method for manufacturing a positive electrode sheet provided with a current collecting foil and an active material layer formed on the current collecting foil, the active material layer containing positive active material particles that allow insertion and extraction of a lithium ion, the method comprising:
a paste producing step of producing a positive electrode paste by the positive electrode paste producing method according to claim 7;
a coating step of applying the positive electrode paste onto the current collecting foil to form an undried active material layer; and
a layer drying step of drying the undried active material layer on the current collecting foil to form the active material layer.

14. A method for manufacturing a positive electrode sheet provided with a current collecting foil and an active material layer formed on the current collecting foil, the active material layer containing positive active material particles that allow insertion and extraction of a lithium ion, the method comprising:
a paste producing step of producing a positive electrode paste by the positive electrode paste producing method according to claim 8;
a coating step of applying the positive electrode paste onto the current collecting foil to form an undried active material layer; and
a layer drying step of drying the undried active material layer on the current collecting foil to form the active material layer.

15. A method for manufacturing a positive electrode sheet provided with a current collecting foil and an active material layer formed on the current collecting foil, the active material layer containing positive active material particles that allow insertion and extraction of a lithium ion, the method comprising:

a paste producing step of producing a positive electrode paste by the positive electrode paste producing method according to claim 9;

a coating step of applying the positive electrode paste onto the current collecting foil to form an undried active material layer; and a layer drying step of drying the undried active material layer on the current collecting foil to form the active material layer.

16. A method for manufacturing a positive electrode sheet provided with a current collecting foil and an active material layer formed on the current collecting foil, the active material layer containing positive active material particles that allow insertion and extraction of a lithium ion, the method comprising:

a paste producing step of producing a positive electrode paste by the positive electrode paste producing method according to claim 10;

a coating step of applying the positive electrode paste onto the current collecting foil to form an undried active material layer; and a layer drying step of drying the undried active material layer on the current collecting foil to form the active material layer.

17. A method for manufacturing a lithium ion secondary battery provided with a positive electrode sheet including a current collecting foil and an active material layer formed on the current collecting foil, the active material layer containing positive active material particles that allow insertion and extraction of a lithium ion, the method comprising:

a positive electrode sheet manufacturing step of manufacturing the positive electrode sheet by the positive electrode sheet manufacturing method according to claim 13; and a battery assembling step of assembling the lithium ion secondary battery by using the positive electrode sheet.

18. A method for manufacturing a lithium ion secondary battery provided with a positive electrode sheet including a current collecting foil and an active material layer formed on the current collecting foil, the active material layer containing positive active material particles that allow insertion and extraction of a lithium ion, the method comprising:

a positive electrode sheet manufacturing step of manufacturing the positive electrode sheet by the positive electrode sheet manufacturing method according to claim 14; and a battery assembling step of assembling the lithium ion secondary battery by using the positive electrode sheet.

19. A method for manufacturing a lithium ion secondary battery provided with a positive electrode sheet including a current collecting foil and an active material layer formed on the current collecting foil, the active material layer containing positive active material particles that allow insertion and extraction of a lithium ion, the method comprising:

a positive electrode sheet manufacturing step of manufacturing the positive electrode sheet by the positive electrode sheet manufacturing method according to claim 15; and a battery assembling step of assembling the lithium ion secondary battery by using the positive electrode sheet.

20. A method for manufacturing a lithium ion secondary battery provided with a positive electrode sheet including a current collecting foil and an active material layer formed on the current collecting foil, the active material layer containing positive active material particles that allow insertion and extraction of a lithium ion, the method comprising:

a positive electrode sheet manufacturing step of manufacturing the positive electrode sheet by the positive electrode sheet manufacturing method according to claim 16; and a battery assembling step of assembling the lithium ion secondary battery by using the positive electrode sheet.

* * * * *